Patented Oct. 16, 1928.

1,688,044

UNITED STATES PATENT OFFICE.

LEON W. GELLER, OF HAMBURG, NEW YORK, ASSIGNOR TO NATIONAL ANILINE & CHEMICAL CO., INC., OF NEW YORK, N. Y., A CORPORATION OF NEW YORK.

MONAZO DYES FROM PYRAZOLONES AND AMINOBENZENE-POLYSULPHONIC ACIDS.

No Drawing.   Application filed December 23, 1925.   Serial No. 77,375.

This invention relates to the manufacture and production of new azo coloring matters of the pyrazolone series which are of value for dyeing wool and other material. Material dyed with one or more of the new dyestuffs also constitutes a part of the present invention.

According to the present invention, it has been found that new and valuable azo dyestuffs can be obtained by coupling a diazotized aniline polysulphonic acid, more particularly a diazotized aniline disulphonic acid, into a 1-aryl-5-pyrazolone body of the benzene or naphthalene or other aromatic series which may contain substituents in the aryl radical.

The new coloring matters are azo pyrazolone compounds which contain the following probable atomic grouping:

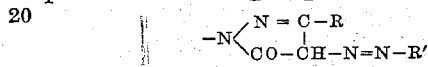

wherein R signifies a methyl or a carboxyl group, and R' represents a polysulphonated benzene nucleus which is free from other substituents. They also correspond with the formula R−N=N−R' wherein R signifies a 1-aryl-5-pyrazolone nucleus which may contain substituents in the aryl radical, and R' represents a polysulphonated benzene nucleus which is free from other substituents. In the dried and pulverized state and in the form of their sodium salts they constitute yellow to red to brown powders soluble in concentrated sulphuric acid, soluble in water giving yellow to red to brown colorations and dye wool yellow to red to brown shades. Upon reduction, for example with stannous chloride and hydrochloric acid, they yield a polysulphonated aniline and a 1-aryl-4-amino-5-pyrazolone body.

The following specific example will further illustrate the invention, but it will be understood that it is not limited thereto. The parts are by weight.

*Example.*—177 parts of aniline-2.4-disulphonic acid are dissolved in 1500 parts water and 140 parts of 55° Bé. sulphuric acid, and the iced solution is diazotized by means of about 49 parts of sodium nitrite. The diazo solution thus obtained is introduced into a solution, maintained at about 15°–25° C., of 211 parts of the monosodium salt of 1-(2'-methyl-4'-sulphophenyl)-3-carboxy-5-pyrazolone dissolved in about 3000 parts water and sufficient sodium carbonate to maintain an alkaline reaction during the combination. When the combination is complete, the solution is acidified with hydrochloric acid and the dyestuff salted out by the addition of common salt, filtered off and dried. Instead of acidifying the solution with hydrochloric acid, it may be acidified with sulphuric acid, sufficient lime added to partly but not completely neutralize the solution, and the slightly acid solution then filtered and the dyestuff precipitated from the filtrate by the addition of hydrochloric acid and common salt.

The dyestuff thus obtained has, in the form of its free acid, the following probable formula:

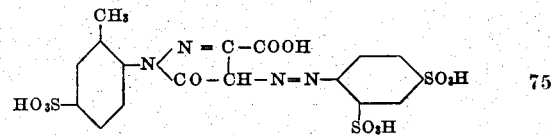

It constitutes a yellow powder, soluble in concentrated sulphuric acid and soluble in water, and dyes wool from an acid bath yellow shades of good fastness to light and to washing. Upon reduction it yields aniline-2.4-disulphonic acid and 1-(2'-methyl-4'-sulphophenyl)-3-carboxy-4-amino-5-pyrazolone.

In a similar manner, the diazo compounds of other aniline polysulphonic acids can be used such as, for example, aniline-2.5-disulphonic acid, aniline-3.5-disulphonic acid, etc. For instance, the dye from aniline-3.5-disulphonic acid and 1-(2'-methyl-4'-sulphophenyl)-3-methyl-5-pyrazolone has the following probable formula:

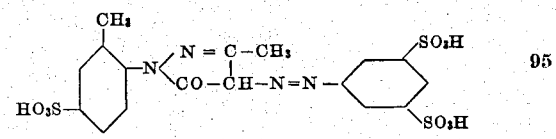

In the specification and claims it will be understood that the pyrazolone bodies contemplated in the present invention carry a methyl or a carboxyl group in the 3-position of the pyrazolone nucleus unless otherwise specified, and are capable of combining in 4-position with diazo compounds.

I claim:

1. As new products, the azo pyrazolone coloring matters which contain the probable atomic grouping:

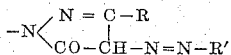

wherein R represents a methyl or a carboxyl group, and R' signifies a polysulphonated benzene nucleus which is free from other substituents.

2. A composition of matter comprising an azo pyrazolone compound which contains the probable atomic grouping:

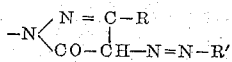

wherein R represents a methyl or a carboxyl group, and R' signifies a di-sulphonated benzene nucleus which is free from other substituents.

3. As new products, the azo pyrazolone coloring matters which correspond with the probable formula: R—N=N—R' wherein R signifies a 1-aryl-5-pyrazolone body of the benzene series which may contain substituents in the benzene nucleus and R' represents a di-sulphonated benzene nucleus which is free from other substituents.

4. As new products, the azo pyrazolone coloring matters which in the free state correspond with the probable formula:

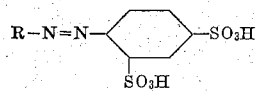

wherein R signifies an aryl-pyrazolone body of the benzene series which contains a sulphonic acid group in the phenyl nucleus.

5. As a new product, the monazo pyrazolone dyestuff which in the free state corresponds with the probable formula:

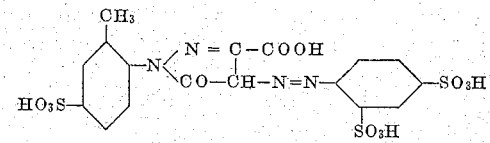

6. Material dyed with a coloring matter of claim 1.

7. Material dyed with a coloring matter of claim 2.

8. Material dyed with a coloring matter of claim 3.

9. Material dyed with a coloring matter of claim 4.

10. Material dyed with the coloring matter of claim 5.

In testimony whereof I affix my signature.

LEON W. GELLER.